Aug. 17, 1948.                A. C. SCINTA                2,447,282
                                GAUGE
                          Filed March 3, 1944
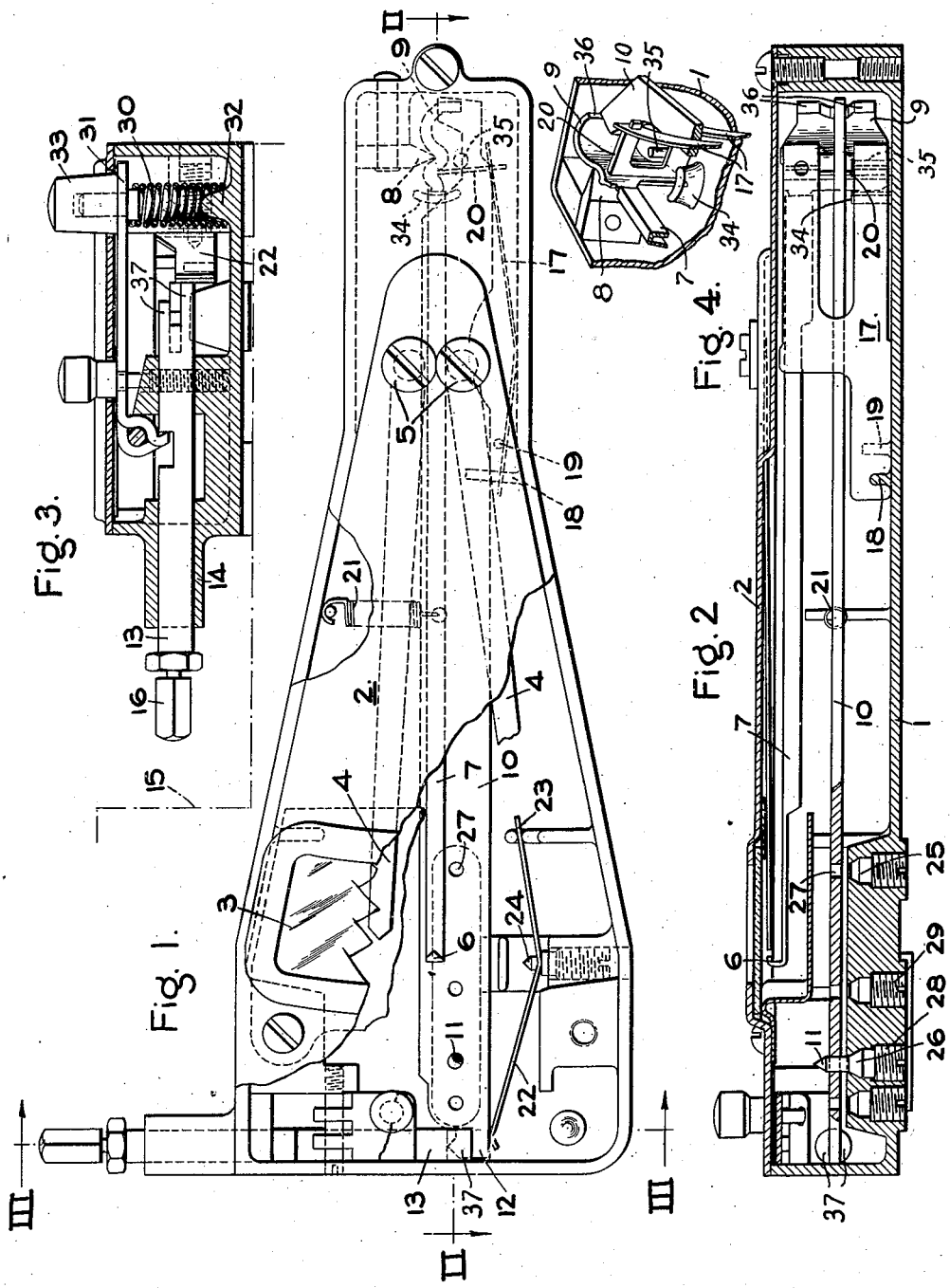
INVENTOR
ANTHONY C. SCINTA
BY
Bean, Brooks, Buckley & Bean.
ATTORNEYS Patented Aug. 17, 1948

2,447,282

UNITED STATES PATENT OFFICE 2,447,282

GAUGE

Anthony C. Scinta, Buffalo, N. Y., assignor to Trico Products Corporation, Buffalo, N. Y.

Application March 3, 1944, Serial No. 524,899

11 Claims. (Cl. 33—172)

This invention relates to the gauge art and primarily to the comparator type wherein the dimensional characteristic of the workpiece is multiplied by amplified mechanism and impressed upon an indicator for ready observation. Such a gauge is disclosed in Patent No. 2,362,203, dated Nov. 7, 1944.

The object of the present invention is to provide a gauge which embodies a flexibility of construction that enables its adaptation to various usages heretofore precluded by reason of the character and requirement of the instrument.

Further, the invention resides in a gauge in which the movement amplifying mechanism is adjustable to convert the gauge into an instrument having plural magnifications selectively determined for varying the sensitiveness of the gauge.

A further object is to provide a gauge which is efficient in operation and practical in construction.

In the drawings:

Fig. 1 is a plan view of a gauge embodying the present invention, parts being broken away for clearness of the disclosure;

Fig. 2 is a longitudinal section about on line 2—2 of Fig. 1;

Fig. 3 is a transverse section about on line 3—3 of Fig. 1; and Fig. 4 is a fragmentary perspective view of the opposite end of the gauge.

Referring more particularly to the drawing, the numeral 1 designates the box-like casing having a cover 2 with a window 3. Plus and minus tolerance indicators 4 are pivotally mounted by adjustable pivot pins 5 on the cover and show at the window to adapt the instrument for comparator gauging. These indicating fingers are associated with size indicating means in the form of a pointer 6 which latter may be the free end of the longer arm 7 of a secondary lever fulcrumed on a knife edge support 8. The shorter arm 9 is acted upon by the longer arm 10 of a primary lever, the latter being pivotally mounted by a pin 11 while having its shorter arm 12 acted upon by the work engaging plunger 13. These two levers constitute a mechanism for amplifying the movement imparted thereto by the work engaging plunger. The plunger is slidably mounted in bearings 14 and has its inner end formed with a diametral slot for receiving the short arm 12. An anvil is indicated by the broken line 15, and between the anvil and the plunger tip 16 is inserted the workpiece to be tested after first setting the tolerance indicators. This setting is readily accomplished by inserting a master piece between the anvil and the plunger. The pointer when poised between the two indicators will designate an acceptable piece; when outside the indicators the pointer will denote the workpiece as rejectable.

A flat spring 17 removably anchored by a rib 18 and an upstanding pin 19, presses through a strut 20 upon the secondary lever to hold it on its knife edge 8, while a coiled tension spring 21 pulls on the longer arm 10 of the primary lever to hold it engaged with the secondary lever. For determining the desired uniform pressure of the gauging contact a flat spring 22 is provided with one end anchored at 23 and its opposite end bearing on the lever 10, the tension of the spring being regulated by a flexing screw 24 to modify the plunger projecting urge of spring 17.

The pivotal mounting for the primary lever is adjustable to vary the multiplying action thereof, such adjustment being definitely predeterminable so as to preserve the accuracy of the instrument at all times. To this end the casing 1 is formed with a series of seats 25 for selectively receiving the anchoring head 26 of the lever mounting pin 11. Likewise the primary lever is formed with a registering series of holes 27 to receive the pin. Each seat 25 conformably receives the anchoring head and has a conical portion against which the head is driven and clamped by a backing screw plug 28, which latter may be integral with the head. The spacing of the seats is predetermined to give a plurality of different ratios from which choice may be made, such as a fifty to one multiplication for the innermost seat, and relatively larger amplifications for the succeeding seats. In the illustrated selection, with the mounting pin in the third seat the amplifying ratio may be two hundred to one, and for convenience suitable designations may be placed alongside the respective seats on the bottom of the casing. The unused seats 25 will be sealed by closure plugs 29 to preclude the entrance of dirt into the casing. Since the relocation of the pivot 11 changes the leverage, the spring 22 will be readjusted to exert the desired pressure on the plunger.

From the foregoing it will be observed that the gauging instrument has a wide ratio range of utility and is especially adaptable for shops and plants where various kinds of comparator gauging are required. The construction is durable and practical and may be economically produced. By simply removing the screw plug 28 with its lever mounting pin 11 and inserting it in another seat, an entirely different movement amplifying mechanism will be constructed.

For use, the work engaging plunger is normally held retracted from the anvil 15 to facilitate and expedite the placement and removal of the workpiece. This retraction is effected herein by a spring 30 acting through a manual retractor element 31. The spring 30, which is positioned by a boss 32, counteracts the resilient urge tending to project the plunger but may be rendered inoperative upon depressing the knob 33. Therefore, after placement of the workpiece against the anvil, the retractor is depressed to release the plunger for movement against the workpiece and the position of the pointer noted with respect to the tolerance indicators in the window. Thereafter the knob 33 is released and the retractor spring 30 functions to retract the plunger so that the workpiece may be removed.

To render the instrument sturdy, means are provided to preclude the accidental displacement of the levers through rough handling, such as a guard rail 34 and a pin 35 upstanding adjacent the knife edge 8 to secure the mounting of the secondary lever. The primary lever has its opposite ends straddled by portions of the secondary lever at 36 and the plunger at 37 which, in conjunction with the spring 21, hold it on the pivot pin 11. In this connection it may be stated that the lever mounting pin 11 may be readily inserted selectively in any one of the series of holes 27 from without the casing 1, the tip of such pin being pointed so as to center the primary lever 10 with respect thereto when reinserting the same should the lever shift under the urge of the spring 21. The radius of the fulcrum pin is greater than any permissible shifting movement of the primary lever, and since the latter is supported at its opposite ends by the plunger 13 and the secondary lever, such pin will readily find the selected recess when making a change in the leverage of the movement amplifying mechanism.

The foregoing description has been made in detail for clearness of disclosure and not by way of limitation since the inventive principles are susceptible of assuming other physical embodiments without departing from the spirit of the invention and the scope of the appended claims.

What is claimed is:

1. A comparator instrument comprising a support, a work engageable member movable thereon, movement amplifying mechanism having a primary lever and a secondary lever, the primary lever acting at one end on the member and at its opposite end on the secondary lever, the opposite ends of the primary lever interfitting with the member and the secondary lever to be held thereby against bodily movement laterally of its plane of movement, and a fulcrum pin normal to such plane and removably engaged in a recess in the primary lever for mounting the latter.

2. A comparator instrument comprising a support, a work engageable member movable thereon, movement amplifying mechanism having a primary lever and a secondary lever, the primary lever acting at one end on the member and at its opposite end on the secondary lever, the opposite ends of the primary lever interfitting with the member and the secondary lever to be held thereby against bodily movement laterally of its plane of movement, spring means acting to yieldably secure the interfitting parts operatively related, and a fulcrum pin normal to such plane and removably engaged in a recess in the primary lever for mounting the latter.

3. A comparator instrument comprising a support, a work engageable member movable thereon, movement amplifying mechanism having a primary lever and a secondary lever, the primary lever acting at one end on the member and at its opposite end on the secondary lever, means adjustably mounting one of the levers for varying the ratio of the mechanism, and a spring leaf anchored at one end and having its opposite end overlying said member and adjustable to regulate the contact pressure of the member on a workpiece when the ratio has been varied.

4. A comparator instrument comprising a support having a series of independent seats, a work engageable member movably carried by the support, movement amplifying mechanism having a primary lever and a secondary lever, the primary lever having a like longitudinal series of individual fulcrum seats and acting at one end on the member and at its opposite end on the secondary lever, and fulcrum means selectively engageable in the seats of the support and in the seats of the primary lever for affording definite predetermined changes in the ratio of the mechanism.

5. A comparator instrument comprising a support, a work engageable member movable thereon, movement amplifying mechanism having a primary lever and a secondary lever, the primary lever acting at one end on the member and at its opposite end on the secondary lever, the opposite ends of the primary lever interfitting with the member and the secondary lever to be held thereby against bodily movement laterally of its plane of movement, said support and said primary lever having registering recesses, and a fulcrum pin selectively mounted in the support recesses and engageable in the lever recesses to vary the leverage and change the ratio of the mechanism.

6. A comparator instrument comprising a casing having a wall with a series of holes therethrough, a work engageable member movably carried by the casing, movement amplifying mechanism within the casing and having a primary lever and a secondary lever, the primary lever acting at one end on the member and at its opposite end on the secondary lever, a fulcrum selectively engageable in the holes of the casing and also selectively engageable at predetermined points on the primary lever to vary the ratio of the mechanism, and adjustable spring means acting to maintain the desired contact pressure of said member on a workpiece.

7. A comparator instrument comprising a support, a work engageable member movable thereon, movement amplifying mechanism having a primary lever and a secondary lever, the primary lever acting at one end on the member and at its opposite end on the secondary lever, the opposite ends of the primary lever interfitting with the member and the secondary lever to be held thereby against bodily movement laterally of its plane of movement, spring means acting to yieldably secure the interfitting parts operatively related, said support having a series of seats, a fulcrum pin selectively insertible upwardly from without through the seats, the primary lever having holes registering with the seats and engageable by the pin to mount the primary lever, a flat spring anchored on the support and having a part pressing on the primary lever adjacent the member for urging the latter into gauging contact with a workpiece, and adjustable means acting on the flat spring to regulate contact pressure on the workpiece.

8. A comparator instrument comprising a support, a work engageable member movable thereon, movement amplifying mechanism having a primary lever and a secondary lever, the primary lever acting at one end on the member and at its opposite end on the secondary lever, the secondary lever terminating at its free end in a pointer, a knife edge removably mounting the secondary lever, and guard means opposing the knife edge to preclude inoperative displacement of the secondary lever therefrom.

9. A comparator instrument comprising a support, a work engageable member movable thereon, movement amplifying mechanism having a primary lever and a secondary lever, the primary lever acting at one end on the member and at its opposite end on the secondary lever, the secondary lever terminating at its free end in a pointer, a knife edge removably mounting the secondary lever, a guard rail concentric with the knife edge and interlockable with the secondary lever upon lateral displacing movement of the latter from the knife edge, and a stop shoulder opposing the knife edge but disposed on the opposite side of the secondary lever to prevent the latter lifting from the knife edge.

10. A comparator instrument comprising a support, a work engageable member movable thereon, movement amplifying mechanism having a primary lever and a secondary lever, the primary lever acting at one end on the member and at its opposite end on the secondary lever, means adjustably mounting one of the levers for varying the ratio of the mechanism, a flat spring anchored at one end and bearing at another portion on the primary lever for providing contact pressure of the member on a workpiece, and means for adjusting the urge of said spring to regulate such contact pressure.

11. A comparator instrument comprising a support, a work engageable member movable thereon, movement amplifying mechanism having a primary lever and a secondary lever, the primary lever acting at one end on the member and at its opposite end on the secondary lever, the opposite ends of the primary lever interfitting with the member and the secondary lever to be supported thereby, said support and said primary lever having registering recesses, and a fulcrum pin selectively mounted in the support recesses and engageable in the lever recesses to vary the leverage and change the ratio of the mechanism, the lever engaging end of the pin being pointed to facilitate the centering of the primary lever with the respect to the pin when the latter is inserted in any recess.

ANTHONY C. SCINTA.

REFERENCES CITED

The following references are of record in the file of this patent:

UNITED STATES PATENTS

| Number | Name | Date |
| --- | --- | --- |
| 1,328,378 | Johnson | Jan. 20, 1920 |
| 1,390,432 | Douglass | Sept. 13, 1921 |
| 1,425,438 | Bartholdy | Aug. 8, 1922 |